United States Patent
Koyama et al.

(10) Patent No.: US 7,150,565 B1
(45) Date of Patent: Dec. 19, 2006

(54) CYLINDRICAL ROLLER BEARING

(75) Inventors: Mineo Koyama, Kuwana (JP); Hideto Torisawa, Kuwana (JP); Hiroshi Takiuchi, Kuwana (JP); Mamoru Mizutani, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/394,420

(22) Filed: Mar. 13, 2003

(30) Foreign Application Priority Data

Mar. 20, 2002 (JP) .............................. 2002-078625
Mar. 20, 2002 (JP) .............................. 2002-078638

(51) Int. Cl.
*F16C 19/00* (2006.01)

(52) U.S. Cl. .................... 384/450; 384/564; 384/548

(58) Field of Classification Search ................ 384/548, 384/557, 558, 564, 565, 569, 572, 576, 450; 409/231
See application file for complete search history.

(56) References Cited

U.S. PATENT DOCUMENTS

| | | | | |
|---|---|---|---|---|
| 4,318,574 | A | | 3/1982 | Nakamura ............... 308/216 |
| 4,319,789 | A | | 3/1982 | Irwin .................... 308/207 R |
| 4,523,862 | A | * | 6/1985 | Yasui et al. ............. 384/564 |
| 5,007,747 | A | * | 4/1991 | Takeuchi et al. ........ 384/450 |
| 5,064,298 | A | * | 11/1991 | Hibi et al. .............. 384/625 |
| 5,716,146 | A | * | 2/1998 | Murai et al. ............ 384/450 |
| 5,921,685 | A | * | 7/1999 | Ishimaru et al. ........ 384/564 |
| 6,033,123 | A | | 3/2000 | Sato et al. .............. 384/571 |
| 6,086,262 | A | * | 7/2000 | Matsumoto ............. 384/571 |
| 6,196,724 | B1 | * | 3/2001 | Murai et al. ............ 384/450 |
| 6,216,798 | B1 | * | 4/2001 | Riello et al. ............ 173/152 |
| 6,227,777 | B1 | * | 5/2001 | Kosmowski ............ 409/231 |
| 6,254,277 | B1 | * | 7/2001 | Nagai et al. ............ 384/450 |
| 6,318,897 | B1 | * | 11/2001 | Shitsukawa et al. ..... 384/450 |
| 6,702,471 | B1 | * | 3/2004 | Sakoda et al. .......... 384/450 |

FOREIGN PATENT DOCUMENTS

| | | |
|---|---|---|
| DE | 3910959 | 10/1990 |
| JP | 52-79156 | 7/1977 |
| JP | 56-17415 | 7/1979 |
| JP | 58-043609 | 3/1983 |
| JP | 58-43609 | 9/1983 |
| JP | 59-106719 | 6/1984 |
| JP | 4-60215 * | 2/1992 |
| JP | 05-096463 | 4/1993 |
| JP | 07-12119 | 1/1995 |
| JP | 07-012119 | 1/1995 |
| JP | 10-043909 | 2/1998 |
| JP | 11-132244 | 5/1999 |
| JP | 11-236920 | 8/1999 |
| JP | 2000-2251 | 1/2000 |
| JP | 2001-082464 | 3/2001 |
| JP | 2001-330037 | 11/2001 |

* cited by examiner

*Primary Examiner*—Richard Ridley
*Assistant Examiner*—Justin Krause
(74) *Attorney, Agent, or Firm*—J.C. Patents

(57) ABSTRACT

Contact surface pressure P increases rather drastically in proportion to skew angle $\theta$ within the range of $0 < \theta \leq \theta_T$, but because the critical skew $\theta_T$ is restricted to be small, the contact surface pressure P changes in a low range below a certain level $P_0$ at which wear occurs in contact portions. Thus restricting the critical skew angle $\theta_T$ to a small angle reduces the contact surface pressure P and suppresses heat generation and wear in the contact portions.

5 Claims, 16 Drawing Sheets

CYLINDRICAL ROLLER BEARING

BACKGROUND OF THE INVENTION

1. Field of the Invention

The present invention relates to a cylindrical roller bearing suitable for supporting a shaft in high speed installations such as machining tools, jet aircraft engines, and gas turbines.

2. Description of the Related Art

Spindle apparatuses of machining tools such as machining centers, CNC lathe turning machines, milling machines, and the like are often operated at high speed for the sake of better machining efficiency and higher precision of work, and the recent trend is toward further increase in the speed of spindle rotation.

Generally, in a spindle apparatus of a machining tool, the spindle is supported rotatably relative to the housing by rolling bearings respectively disposed at the front side or tool side and at the rear side opposite the tool side. Lubrication of the rolling bearings is achieved by any of oil mist lubrication, air/oil lubrication, jet lubrication, and grease lubrication, in accordance with various conditions of use. The rolling bearing on the front side normally has a structure that does not allow any axial displacement of the spindle and so is a "fixed side", while the bearing on the rear side has a structure that allows for some axial displacement of the spindle for absorbing or relieving expansion of the spindle in the axial direction due to heat generated during the operation, and thus this side is a "free side." Duplex angular ball bearings, or duplex angular ball bearings with double row cylindrical roller bearings are commonly used as the roller bearing on the front side, while duplex angular ball bearings, or double row or single row cylindrical roller bearings are commonly used as the roller bearing on the rear side.

A cylindrical roller bearing generally includes an inner ring having a raceway on its outer periphery, an outer ring having a raceway on its inner periphery, a plurality of cylindrical rollers rotatably arranged between the raceways of the inner and outer rings, and a cage for holding the cylindrical rollers at circumferentially spaced locations.

The inner ring may be provided with collars on both sides, in which case there are provided recesses at respective corners where the collar surface of both collars and inner raceway intersect each other. These recesses are formed as a result of providing an undercut when grinding the raceways and the collar surfaces. Similarly, at the corners where the rolling surfaces and both end faces of the cylindrical rollers intersect, there are provided respective chamfers. The distance between the axially opposing collar surfaces is slightly larger than the length of the cylindrical rollers, so that guide clearances are secured between the cylindrical rollers and the collars.

Because the rolling surfaces of the cylindrical rollers and the raceways of the inner and outer rings make line contact with each other, the cylindrical roller bearings can hold heavy radial loads and are suitable for high speed applications. On the other hand, more heat is generated during high speed rotation in these bearings as compared to ball bearings, and the portions where the cylindrical rollers and the collars make sliding contact are particularly susceptible to heat generation and wear. That is, because the guide clearances mentioned above allow for some freedom of inclination of the cylindrical rollers, the occurrence of "skew" is inevitable, in which the axial line of the cylindrical rollers inclines relative to the axial line of the bearing during rotation. The angle of the axial line of the cylindrical rollers relative to the axial line of the bearing is named as a skew angle $\theta$. When the cylindrical roller is skewed, an axial component is created in the drive force given by the rotating raceway, which will act as an axial thrust F on the cylindrical roller, pressing its end toward the collar on one side. This can cause high friction resistance in the sliding contact portions, resulting in heat generation and wear.

Various improvements have been suggested so far with respect to such problem. Japanese Patent Publication No. Sho 58-43609, for example, shows a bearing construction in which the height of the recesses is made higher than the height of chamfers of the cylindrical rollers, and in which the collar surfaces are provided with an increasing taper at a predetermined angle toward the outside in axial direction, whereby lubrication state of the sliding contact portions is improved.

Japanese Patent Laid-Open Publication No. Hei 7-12119 shows a bearing construction in which, when the cylindrical roller is skewed, its outer peripheral portion on either end face will contact the collar surface at a location toward the base end, so that the edge load on the sliding contact portion is reduced as compared to the case in which the outer peripheral portion on either end face of the cylindrical roller makes contact with a distal edge of the collar. In the case when both ends of the cylindrical rollers respectively make contact with the collars on both sides, the skew angle becomes maximum, that is called maximum skew angle $\theta_{MAX}$.

The cylindrical rollers are free to incline by the amount of the guide clearances as noted above, and during rotation of the bearing, they rotate and revolve while changing their attitude from one second to the next within the range of maximum skew angle $\theta_{MAX}$.

Referring now to the model view of FIG. 7, when the cylindrical roller 23 is skewed at a skew angle $\theta$ lower than the maximum skew angle $\theta_{MAX}$ it is pressed by the axial thrust F mentioned above toward one side in the axial direction, and rolls in a state in which it is pressed against one of the collars 21b. With referring to FIGS. 8 and 17, the skew angle $\theta$ is the angle of the axial line 1cr of the cylindrical rollers 23 relative to the axial line 1b of the bearing 21. In the case when a boundary R13 between the end face 23b and the chamfer 23c of the cylindrical roller 23 makes contact with a boundary R11 between the collar surface 21b1 and the recess 21c, the skew angle $\theta$ is called a critical skew angle $\theta_T$. With referring to FIG. 18, in the case when both ends of the cylindrical rollers 23 respectively make contact with the collars 21b on both sides, the skew angle $\theta$ becomes the maximum skew angle $\theta_{MAX}$. The state of contact between the cylindrical roller 23 and the collar 21b changes as follows in accordance with the skew angle $\theta$ in the range of $0<\theta_T<\theta_U<\theta_{MAX}$.

In the range of $0<\theta<\theta_T$, a boundary R13 between the end face 23b and the chamfer 23c of the cylindrical roller 23 makes contact with a boundary R11 between the collar surface 21b1 and the recess 21c as indicated by a black circle in FIG. 8, while, in the range of $\theta_T<\theta<\theta_U$, the boundary R13 between the end face 23b and the chamfer 23c of the cylindrical roller 23 makes contact with the collar surface 21b1 as indicated by a black circle in FIG. 9. As the skew angle $\theta$ approaches $\theta_U$, the boundary R13 between the end face 23b and the chamfer 23c of the cylindrical roller 23 makes contact with a boundary R12 between the collar surface 21b1 and the chamfer 21b3 (not shown). The maximum skew angle $\theta_{MAX}$ will have been reached when both end portions of the cylindrical roller 23 respectively make contact with the collars 21b on both sides (not shown).

FIG. 10 shows the relationship between the skew angle θ of the cylindrical rollers 23 and the contact surface pressure P between the cylindrical rollers 23 and the collars 21b in solid line, and the relationship between the skew angle θ and the axial thrust F acting on the cylindrical rollers 23 in broken line. As can be seen from the drawing, the axial thrust F increases in proportion to the skew angle θ.

The contact surface pressure P increases rather drastically with the increase of the skew angle θ in the range of $0<\theta\leq\theta_T$. This is because the cylindrical roller 23 and the collar 21b make contact with each other at the boundaries R13 and R11 as shown in FIG. 8, and because the axial thrust F becomes larger with the increase of the skew angle θ. It was ascertained through tests that, in the range of $\theta_0 \leq \theta \leq \theta_T$ indicated by cross hatching in FIG. 10 in particular, the contact surface pressure P exceeds a certain level $P_0$ at which wear occurs in the contact portions.

After the skew angle θ exceeds $\theta_T$, the surface contact pressure P decreases below the level $P_0$ and moves stably within a relatively low range irrespective of the increase of the skew angle θ. This is because the state of contact between the cylindrical roller 23 and the collar 21b has changed from the state of contact at the boundaries R13 and R11 shown in FIG. 8 to the state of contact between the boundary R13 and the collar surface 21b1 shown in FIG. 9.

As the skew angle θ approaches $\theta_U$, the contact surface pressure P increases abruptly and exceeds the level $P_0$ at the time point when it reaches the value $\theta_U$. This is because the state of contact between the cylindrical roller 23 and the collar 21b has changed from the state of contact between the boundary R13 and the collar surface 21b1 shown in FIG. 9 to the state of contact at the boundaries R13 and R12.

As described above, the contact surface pressure P between the cylindrical rollers and the collars is beyond the level $P_0$ at which wear occurs in the contact portions before the skew angle reaches its maximum level $\theta_{MAX}$, namely in the ranges of $\theta_0 \leq \theta \leq \theta_T$ and $\theta_U \leq \theta < \theta_{MAX}$, and this is considered to be a substantial factor in causing heat generation and wear in the contact portions.

There is no mention of the phenomenon described above in Japanese Patent Publication No. Sho 58-43609 mentioned above and so it is not directed to resolve this problem. Japanese Patent Laid-Open Publication No. Hei 7-12119 mentioned above merely defines a contact state between outer peripheral portions on either end face of the cylindrical rollers and the collar surfaces at a maximum skew angle $\theta_{MAX}$. It does not refer to, nor does it provide a solution, to the problem arising before the skew angle reaches its maximum level $\theta_{MAX}$.

In a construction in which duplex angular ball bearings are used on the rear side, clearances are given between the outer ring of the bearing and the housing so as to allow sliding displacement therebetween, because the bearings themselves cannot accommodate axial displacement of the spindle. Alternatively, a sliding member such as a ball bush may be interposed between the outer ring and the housing may lead to creep and wear in the contact portions therebetween particularly when the rotation speed of the spindle is high. In the latter construction, the provision of additional sliding members such as ball bushes results in larger numbers of components and assembling steps. Furthermore, the problem common to both constructions is that costs tend to be high because of the use of angular ball bearings which require two bearings in combination and which often use ceramic balls to be suitable for higher speed applications. Thus the spindle apparatus could be improved in this respect for achieving cost reduction.

Cylindrical roller bearings, on the other hand, can advantageously be used for the rear side for resolving the above problems, because axial displacement of the spindle can be absorbed or relieved by sliding displacement between the cylindrical rollers and the raceways. Moreover, cylindrical roller bearings can hold heavy radial loads because the cylindrical rollers and the raceways make line contact, and therefore they are preferable in securing necessary rigidity of the spindle. On the other hand, cylindrical roller bearings have the problem that more heat is generated during high speed rotation as compared to angular ball bearings.

Driving system for spindle apparatus has recently changed from the belt drive system to a built-in motor drive system in which the spindle is rotated at high speed by a built-in motor, and the latter is now the mainstream because of the demands for higher speed and efficiency. In a spindle apparatus with this drive system, however, there tends to be a difference in the temperature between the spindle and the housing due to the built-in motor which generates heat, because of which the negative clearances in the rolling bearings are increased as compared to an apparatus with the belt drive system, i.e., they are operated in a pre-loaded condition. There is also the problem that thermal expansion of the spindle in the axial direction tends to be large because of the long span between the rolling bearings on the front side and on the rear side.

BRIEF SUMMARY OF THE INVENTION

In view of the above considerations, the present invention has been devised to provide improvements for cylindrical roller bearings.

More specifically, an object of the present invention is to provide a cylindrical roller bearings in which contact surface pressure between cylindrical rollers and collars, particularly before the skew angle of the cylindrical rollers reaches its maximum level $\theta_{MAX}$, is reduced, whereby heat generation and wear in contact portions are reduced, and which is thereby made suitable for high speed applications.

Another object of the present invention is to provide a cylindrical roller bearing suitable for a spindle apparatus of a machining tool operated at higher speed.

Yet another object of the present invention is to provide a cylindrical roller bearing generating less heat during high speed rotation and thus being more suitable for high speed applications.

A further object of the present invention is to provide a cylindrical roller bearing suitably used particularly for the rear side of a spindle apparatus of a machining tool which is operated at high speed.

To achieve the above objects, the present invention provides a cylindrical roller bearing including an inner ring having a raceway on its outer periphery, an outer ring having a raceway on its inner periphery, and a plurality of cylindrical rollers rotatably arranged between the raceway of the inner ring and the raceway of the outer ring, at least one of the inner ring and the outer ring being provided with collars respectively on both sides of its raceway, and at least one of the collars being provided with a recess at a corner where the raceway intersects a collar surface, wherein a critical skew angle $\theta_T$, that is a maximum skew angle at which a boundary between an end face and a chamfer of the cylindrical roller makes contact with a boundary between the collar surface and the recess, is restricted to a predetermined angle or smaller.

By restricting the critical skew angle $\theta_T$ to a predetermined angle or smaller, the contact state between the cylindrical rollers and the collars can be changed from the state shown in FIG. 8 wherein the boundaries are in contact with each other to the state shown in FIG. 9 wherein the boundary and the collar surface are in contact with each other at a smaller skew angle, whereby the contact surface pressure is reduced.

The present invention can be applied to various known types of single row cylindrical roller bearings such as N-type (two-collar inner ring), NU-type (two-collar outer ring), NF-type (two-collar inner ring, one-collar outer ring), NJ-type (one-collar inner ring, two-collar outer ring), and NUP-type (two-collar inner ring with one of the collars being a separately-prepared collar ring, two-collar outer ring). In a construction wherein collars are formed by separate collar rings, recesses may not be provided to the corners where the collar surfaces and raceways meet. The present invention can also be applied to various known types of double row or multi-row cylindrical roller bearings.

The critical skew angle $\theta_T$ can be restricted to the predetermined angle or smaller by controlling various dimensions, such as dimensional difference $\delta$ between the height h1 of the recess and the height h2 of the chamfer of the cylindrical rollers, the inclination angle of the collar surface, and dimensions of chamfers of the cylindrical rollers, within predetermined limits. Preferably, the restriction of the critical skew angle $\theta_T$ should be achieved through controlling the dimensional difference $\delta$ within a predetermined limit. More specifically, it has been ascertained through tests to be described later that favorable results can be achieved by controlling the dimensional difference $\delta$ to be 0.3 mm or smaller, most preferably, 0.25 mm or smaller.

It has also been ascertained through tests to be described later that favorable results can be achieved by restricting the critical skew angle $\theta_T$ to be 14 minutes or smaller. For example, if the inclination angle of the collar surface is in a range of from 15 to 40 minutes and the chamfers of the cylindrical rollers are within the dimensional range specified in JIS (Japanese Industrial Standard) B1506, the condition of $\theta_T \leq 14$ minutes can be satisfied by controlling the dimensional difference $\delta$ to be 0.3 mm or smaller, most preferably, 0.25 mm or smaller.

In order to restrict the critical skew angle $\theta_T$ within the predetermined limit, more particularly, in order to achieve this by controlling the dimensional difference $\delta$, at least one of the chamfers of the cylindrical rollers and the recesses provided to the inner ring should preferably be formed by machining such as grinding after a heat treatment. Thereby, dimensional variations due to thermal deformation of the chamfers of the cylindrical rollers and the recesses of the inner ring are reduced, and the dimensional difference $\delta$ can be controlled precisely.

In the above construction, a maximum skew angle $\theta_{MAX}$, at which both ends of the cylindrical rollers respectively make contact with the collars on both sides, may be restricted to be a predetermined angle or smaller. The maximum skew angle $\theta_{MAX}$ can be restricted to the predetermined angle or smaller by controlling various dimensions, such as guide clearances between / rollers and collars, the height h1 of the recesses, the height h2 of the chamfers of the cylindrical rollers, the height of the collars, the inclination angle of the collar surface, and the height of the chamfers between the collar surface and the outer diameter surface, within predetermined limits. By restricting the maximum skew angle $\theta_{MAX}$ to be a predetermined angle or smaller, the possibility that the cylindrical rollers and the collars make contact with each other with high contact surface pressure in a range near the maximum skew angle $\theta_{MAX}$ is reduced, or in other words, the angle range of $\theta_U \leq \theta < \theta_{MAX}$ in FIG. 10 is made narrower, whereby heat generation and wear in contact portions are reduced. It has been ascertained through tests to be described later that favorable results can be achieved by restricting the maximum skew angle $\theta_{MAX}$ to be 37 minutes or smaller.

The cylindrical roller bearing according to the present invention is suitable for a spindle apparatus of a machining tool, and in particular, it exhibits favorable properties when the apparatus is operated with a negative internal clearance and with a grease lubrication system.

According to the present invention, there is provided a cylindrical roller bearing in which heat generation and wear in contact portions between cylindrical rollers and collars are suppressed and which is thereby made suitable for high speed applications, and particularly suitable for a spindle apparatus of a machining tool which is operated at high speed.

To achieve the above objects, the present invention also provides a cylindrical roller bearing including an inner ring having a raceway on an outer periphery thereof, an outer ring having a raceway on an inner periphery thereof, and a plurality of cylindrical rollers rotatably arranged between the raceway of the inner ring and the raceway of the outer ring, wherein a condition of $0.3 \leq Da/H < 0.45$ is satisfied, where Da is a diameter of the cylindrical rollers and H is a cross-sectional height expressed as (D−d)/2, where D is an outer diameter of the bearing and d is an inner diameter of the bearing, and wherein a condition of $0.3 \leq Lw/B < 0.45$ is satisfied, where Lw is a length of the cylindrical rollers and B is a width of the bearing. If the inner ring and the outer ring have different widths, then "the width of the bearing B" should be the width of the outer ring.

Rolling bearings incorporated in a spindle apparatus of a machining tool are normally operated under a pre-loaded condition because of the negative radial internal clearance, which is initially zero or very small but then increased during rotation due to temperature difference between inner and outer rings. Therefore, if the diameter Da and the length Lw of the cylindrical rollers are too large relative to other dimensions, heat will be generated more readily in contact portions between the cylindrical rollers and the raceways.

If the bearing includes a cage, too large a diameter Da and length Lw of the cylindrical rollers are disadvantageous in securing necessary rigidity and strength of the cage. That is, a large diameter Da relative to the cross-sectional height H means a small spacing between adjacent cylindrical rollers, which makes it difficult to make the cage's pillars sufficiently thick in a circumferential direction. Similarly, if the length Lw is large relative to the bearing width B, then the cage's annular portions cannot be made sufficiently thick in the axial direction. Since the cage must hold large loads from cylindrical rollers especially under the pre-loaded condition because of a large lag in roller's revolving motion, if the cage is not sufficiently thick, it cannot have required rigidity and strength particularly if it is made of a resin material.

On the other hand, if the diameter Da and the length Lw of the cylindrical rollers are too small relative to other dimensions, the basic load rating will be too small, resulting in reduced bearing life. Similarly, if the diameter Da is small relative to the cross-sectional height H, the cage cannot be made sufficiently thick in a radial direction.

In consideration of the above, the present invention determines the optimal ranges for the ratio of Da to H, and the ratio of Lw to B as $0.3 \leq Da/H < 0.45$ and $0.3 \leq Lw/B < 0.45$. By setting the ratios Da/H and Lw/B within the above ranges, heat generation in contact portions between the cylindrical rollers and the raceways is suppressed, while a required basic load rating is secured, and if the bearing includes a cage, the cage can be made sufficiently thick to have required rigidity and strength. Because the ratio Lw/B satisfies the condition of $0.3 \leq Lw/B < 0.45$, assembling tolerances in locating the cylindrical rollers relative to raceways are larger than in conventional constructions, leading to ease of assembly.

Moreover, in the cylindrical roller bearing of the present invention applied to the roller bearing on the rear side of a spindle apparatus, the tolerances for sliding displacement between cylindrical rollers and raceways are larger than in conventional constructions. Therefore, it can advantageously be used particularly in a spindle apparatus incorporating a built-in motor, in which thermal expansion of the spindle is relatively large because of the long span between the front side and the rear side. Also, even though the bearing has the same inner diameter and the outer diameter as duplex angular ball bearings, its rigidity is equal to or larger than that of the latter. Accordingly, by adopting the cylindrical roller bearing of the present invention in place of conventional duplex angular ball bearings, cost reduction of spindle apparatus can be achieved.

The cylindrical roller bearing of the present invention includes various known types such as N-type (two-collar inner ring), NU-type (two-collar outer ring), NF-type (two-collar inner ring, one-collar outer ring), NJ-type (one-collar inner ring, two-collar outer ring), and NUP-type (two-collar inner ring with one of the collars being a separately-prepared collar ring, two-collar outer ring).

If the cage is made of a resin material, it should preferably be formed by such a material that has excellent wear resistance, heat resistance, light weightness, and mechanical strength. Fiber-reinforced polyether-ether-ketone is a good example of such a resin material. The cage may be fabricated by any known methods, but for achieving a high mass-productivity, resin injection molding is preferable.

The present invention also provides a spindle apparatus of a machining tool, including a housing, a spindle accommodated in the housing, a rolling bearing on a front side and a roller bearing on a rear side for rotatably supporting the spindle relative to the housing, wherein the rolling bearing on the rear side is a cylindrical roller bearing including an inner ring having a raceway on an outer periphery thereof, an outer ring having a raceway on an inner periphery thereof, and a plurality of cylindrical rollers rotatably arranged between the raceway of the inner ring and the raceway of the outer ring, wherein a condition of $0.3 \leq Da/H < 0.45$ is satisfied, where Da is a diameter of the cylindrical rollers and H is a cross-sectional height expressed as $(D-d)/2$, where D is an outer diameter of the bearing and d is an inner diameter of the bearing.

In the above construction, the ratio of the length Lw of the cylindrical rollers to the bearing width B should preferably satisfy the condition of $0.3 \leq Lw/B < 0.45$, and if a cage is provided, it should preferably be made of a resin material.

The present invention is particularly suitable for a built-in type spindle apparatus in which the spindle is rotated by a built-in motor.

According to the present invention, there is provided a cylindrical roller bearing which generates less heat during high rotation and thus is more suitable for high speed applications.

Also, there is provided a cylindrical roller bearing suitably used particularly for the rear side of a spindle apparatus of a machining tool which is operated at high speed.

DETAILED DESCRIPTION OF THE INVENTION

Preferred embodiments of the present invention will be hereinafter described with reference to the accompanying drawings.

Figure 1:
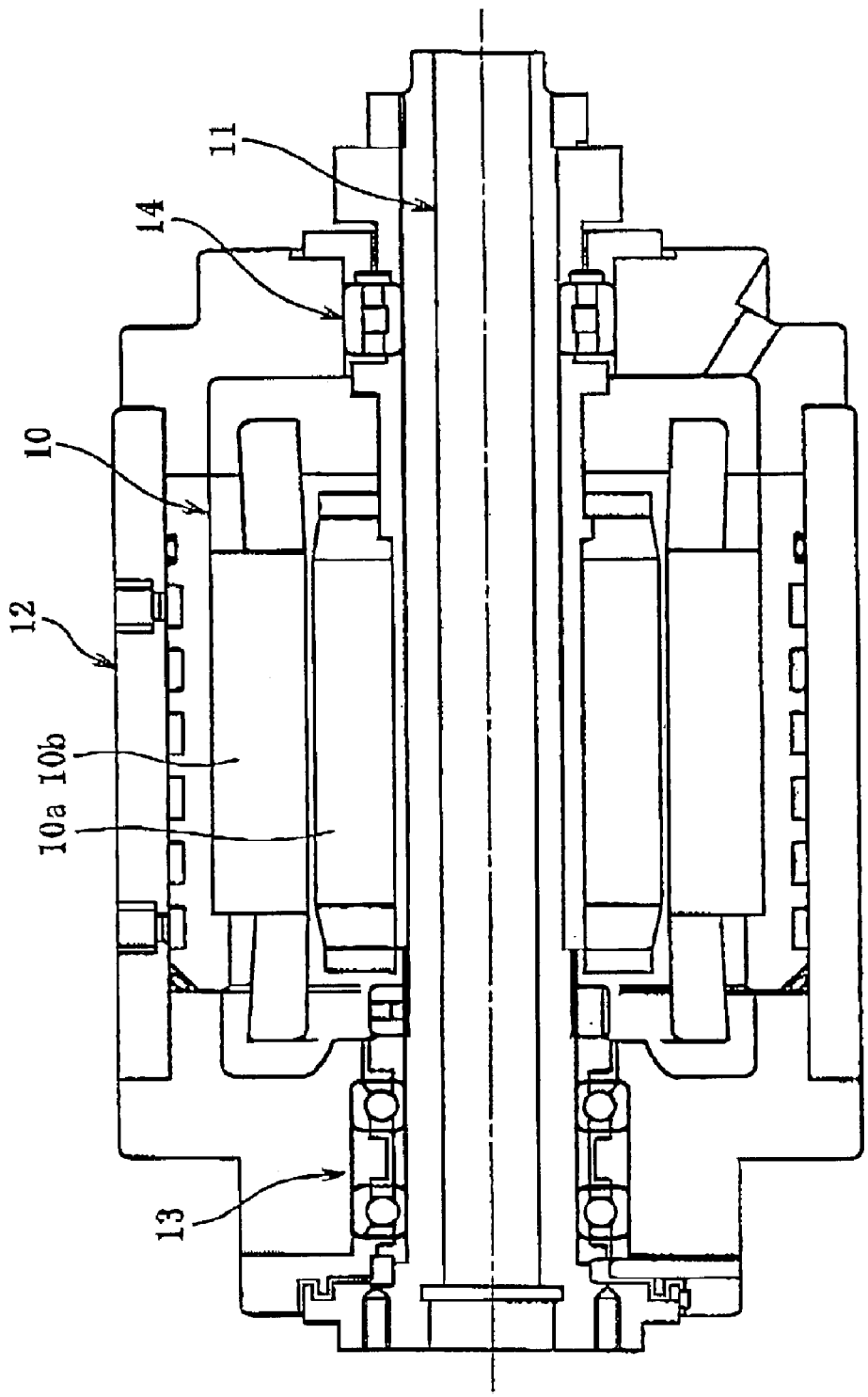
FIG. 1 is a cross-sectional view showing one example of the structure for a spindle apparatus of a machining tool.

FIG. 1 shows one example of the structure of a spindle apparatus in a machining tool such as a machining center, grinder and the like. The illustrated spindle apparatus is a built-in type, in which a spindle 11 is rotated at high speed by a built-in motor 10. The motor 10 is disposed in an axially central portion of the spindle apparatus and made up of a rotor 10a mounted on the outer periphery of the spindle 11 and a stator 10b mounted on the inner periphery of the housing 12. Electric current applied to the stator 10b creates an excitation force between the stator 10b and the rotor 10a, whereby the spindle 11 is rotated at high speed.

The rotating spindle 11 is rotatably supported with respect to the housing 12 by roller bearings respectively arranged at either end of the motor 10, i.e., the front side or tool side and at the rear side opposite the tool side. The rolling bearing on the rear side normally has a structure that allows for some axial displacement of the spindle 11 for absorbing or relieving expansion of the spindle 11 in the axial direction due to heat generated during the operation, and thus this side is a "free side." Duplex angular ball bearings 13 consisting of a pair of angular ball bearings are used as the rolling bearing on the front side, and a single row cylindrical roller bearing 14 is used as the rolling bearing on the rear side.

Figure 2:
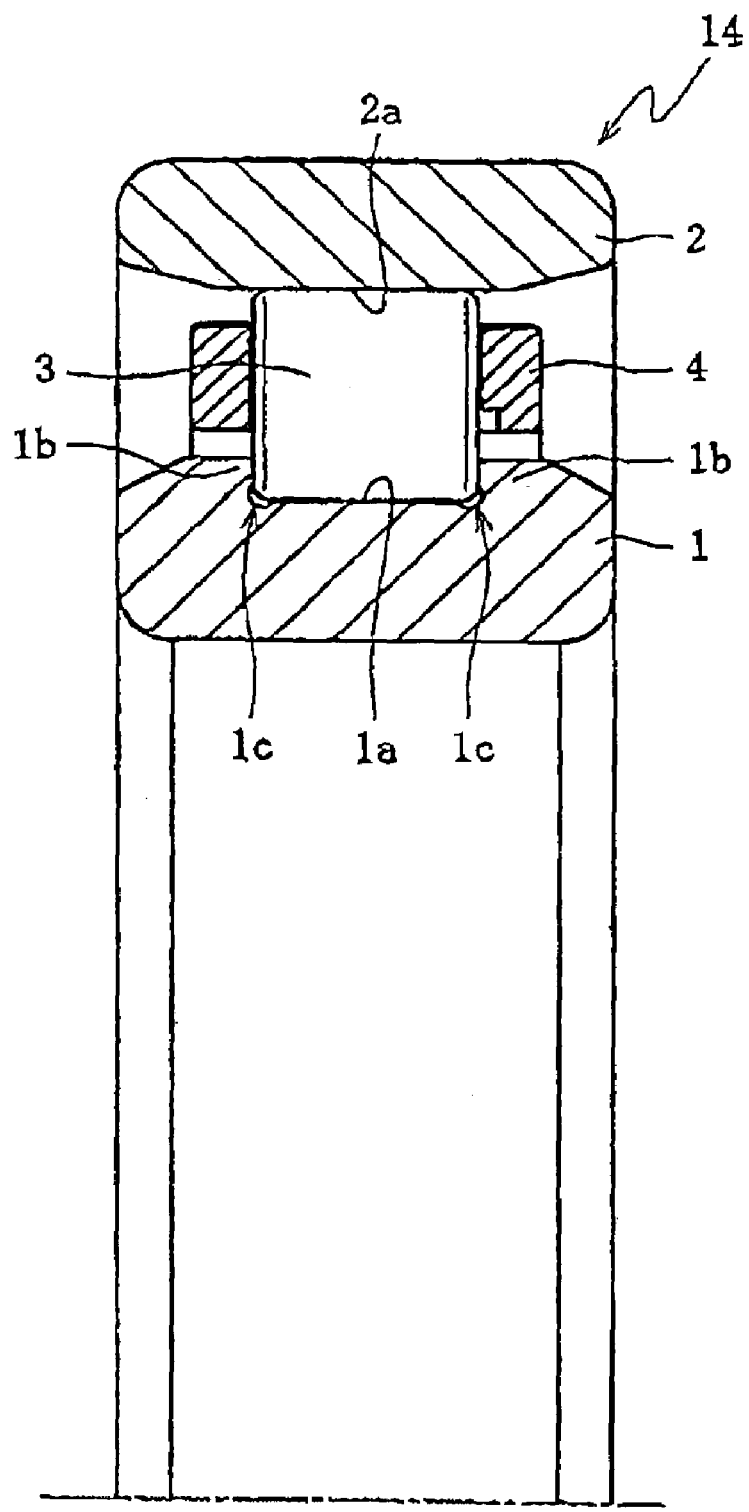
FIG. 2 is a cross-sectional view showing a cylindrical roller bearing according to one embodiment of the invention.

FIG. 2 shows the cylindrical roller bearing 14 disposed on the rear side. The cylindrical roller bearing 14 includes an inner ring 1 having a raceway 1a on its outer periphery, an outer ring 2 having a raceway 2a on its inner periphery, a plurality of cylindrical rollers 3 rotatably arranged between the raceway 1a of the inner ring 1 and the raceway 2a of the outer ring 2, and a cage 4 for holding the cylindrical rollers 3 at circumferentially spaced locations. The inner ring 1 includes collars 1b on both sides thereof. The cage 4 can be made of a resin material.

Figure 3:
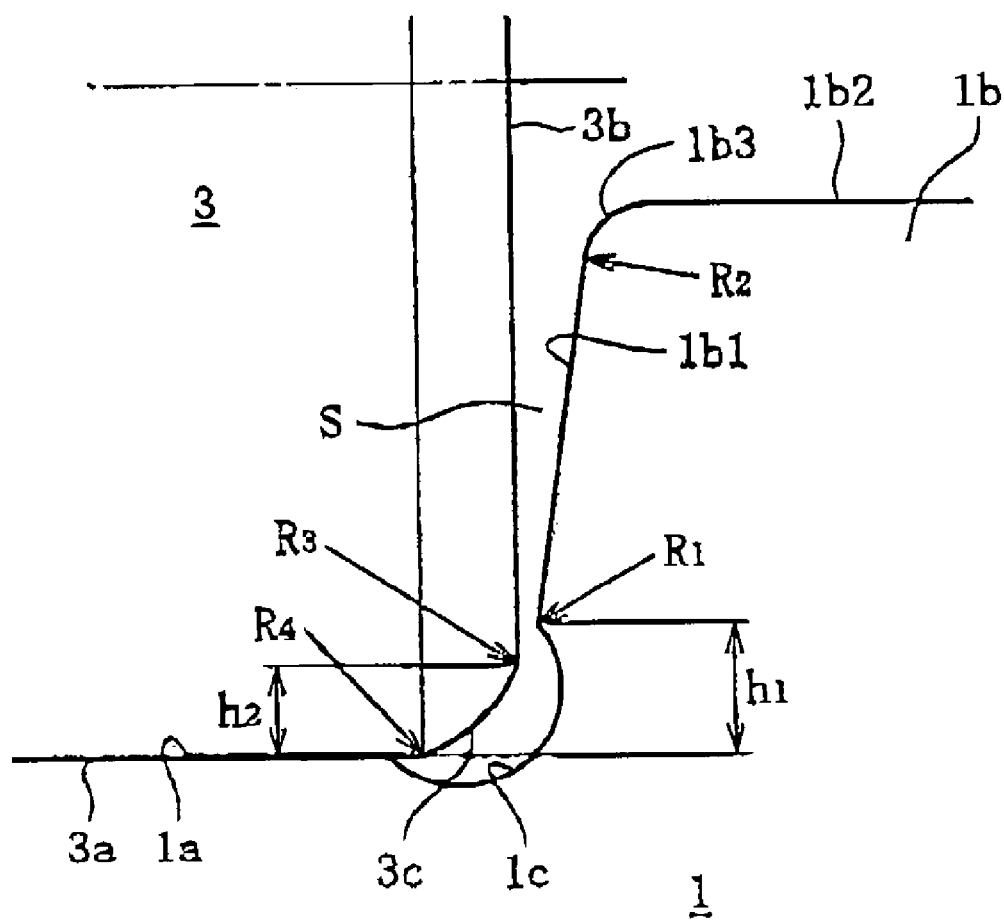
FIG. 3 is an enlarged cross-sectional view showing the vicinity of an end portion of a cylindrical roller and a collar.

As shown in the enlarged view of FIG. 3, recesses 1c are provided respectively at corners where the collar surface 1b1 of both collars 1b and the raceway 1a of the inner ring 1 intersect each other. These recesses 1c are formed as a result of providing an undercut when grinding the raceways 1a and the collar surfaces 1b1. In this embodiment, the collar surface 1b1 has an increasing taper from inside to outside to be wider in the radial direction, and the corners where the collar surface 1b1 and an outer diameter surface 1b2 of the collar 1b intersect each other are provided with chamfers 1b3. Also, the corners where the rolling surface 3a and both end faces 3b of the cylindrical roller 3 intersect each other are provided with chamfers 3c. The distance between the axially opposing collar surfaces 1b1 is slightly larger than the length of the cylindrical roller 3, so that guide clearances S are formed between the end faces 3b of the cylindrical roller 3 and the collar surfaces 1b1.

In this embodiment, the height h1 of the recesses 1c is set larger than the height h2 of the chamfers 3c of the cylindrical roller 3. The dimensional difference δ between height h1 and h2 (=h1−h2) is controlled within a specified limit so that the critical skew angle $\theta_T$ mentioned above does not exceed a predetermined value. In this embodiment, the recesses 1c and the chamfers 3c are finished by a machining process such as grinding after the heat treatment of the inner ring 1 and the cylindrical rollers 3 so as to ensure required dimensional precision and to control the dimensional difference δ within the specified limit. The height h1 is the distance from the raceway 1a to a boundary R1 between the recess 1c and the collar surface 1b1 in the radial direction. The height h2 is the distance from a boundary R4 between the rolling surface 3a and the chamfer 3c to a boundary R3 between the chamfer 3c and the end face 3b in the radial direction.

In order to reduce surface contact pressure, at least one of these boundaries R1–R3 and a boundary R2 between the collar surface 1b1 and the chamfer 1b3 should preferably be a curved surface such as a circular arc surface having a curvature radius of 0.1 to 0.3 mm so as to be smoothly continuous with adjoining surfaces. For example, if the boundary R1 is to be provided with such a configuration, the position of the boundary R1, which is the basis for determining the height h1, should be an intersection between an imaginary extension line of the recess 1c and an imaginary extension line of the collar surface 1b1. Similarly, if the boundary R3 is to be provided with such a configuration, the position of the boundary R3 being the basis for determining the height h2 should be an intersection between an imaginary extension line of the chamfer 3c and an imaginary extension line of the end face 3b. If the boundary R4 is to be provided with such a configuration, the position of the boundary R4 being the basis for determining the height h2 should be an intersection between an imaginary extension line of the rolling surface 3a and the imaginary extension line of the chamfer 3c.

The guide clearances S, the height h1 and h2, the height of the collar 1b or the distance from the raceway 1a to the outer diameter surface 1b2 of the collar 1b in the radial direction, the inclination angle of the collar surface 1b1, and the height of the chamfer 1b3 or the distance from the boundary R2 to the outer diameter surface 1b2 in the radial direction are all controlled, so that the maximum skew angle $\theta_{MAX}$ does not exceed a predetermined value.

The inner ring 1 of the cylindrical roller bearing 14 is coupled on the outer periphery of the spindle 11, while its outer ring 2 is coupled on the inner periphery of the housing 12, as shown in FIG. 1. Radial internal clearances of the bearing in operation are negative clearances, for example, and lubrication is provided inside the bearing by any of oil mist lubrication, air/oil lubrication, jet lubrication, and grease lubrication.

When the spindle 11 is rotated at high speed by the motor 10 built in the spindle apparatus 11, it is rotatably supported by the angular ball bearings 13 on the front side and the cylindrical roller bearing 14 on the rear side with respect to the housing 12. Any thermal expansion of the spindle 11 in the axial direction due to temperature rise during the operation is absorbed or relieved by sliding displacement between the outer ring 2 and the cylindrical rollers 3 of the cylindrical roller bearing 14.

Figure 4:
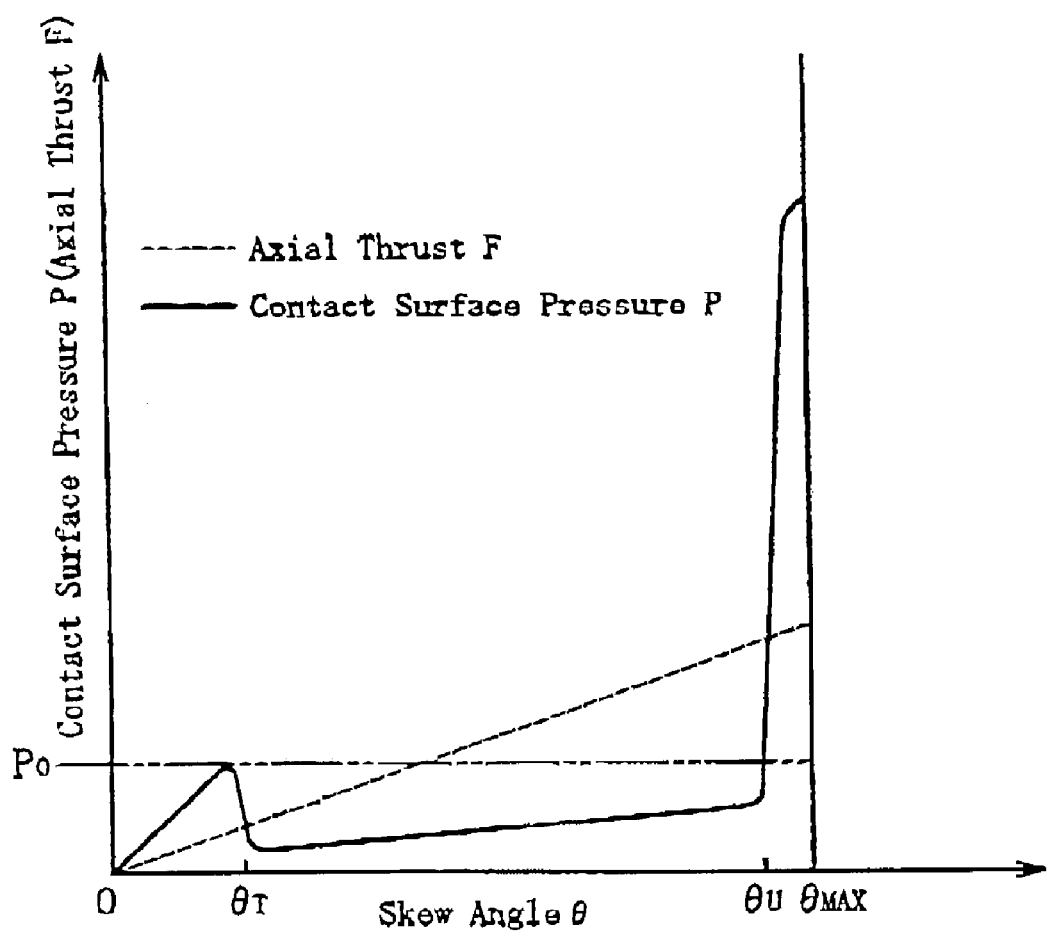
FIG. 4 is a graph showing the relationship between the skew angle θ of cylindrical rollers in the cylindrical roller bearing of this embodiment and contact surface pressure P between cylindrical rollers and collars in solid line, and the relationship between the skew angle θ and the axial thrust F acted on the cylindrical rollers in broken line.

FIG. 4 shows the relationship between the skew angle θ of the cylindrical rollers 3 in the cylindrical roller bearing 14 of this embodiment and the contact surface pressure P between the cylindrical rollers 3 and the collars 1b in solid line, and the relationship between the skew angle θ and the axial thrust F acted on the cylindrical rollers 3 in broken line.

The contact surface pressure P increases rather drastically with the increase of the skew angle θ in the range of $0 < \theta \leq \theta_T$. However, as compared to the case with the prior art shown in FIG. 10, because the critical skew angle $\theta_T$ is restricted to a small angle, the contact surface pressure P changes under the certain level $P_0$ at which wear occurs in the contact portions, i.e., there is no portion in FIG. 4 corresponding to the portion indicated by cross hatching in FIG. 10. That is, even if the cylindrical roller 3 makes contact with the collar 1b at the boundary R3 and the boundary R1 as shown in FIG. 8, if the skew angle θ is small, the axial thrust F that presses the cylindrical roller 3 against the collar 1b is small, and therefore the contact surface pressure P is also relatively small.

Figure 10:
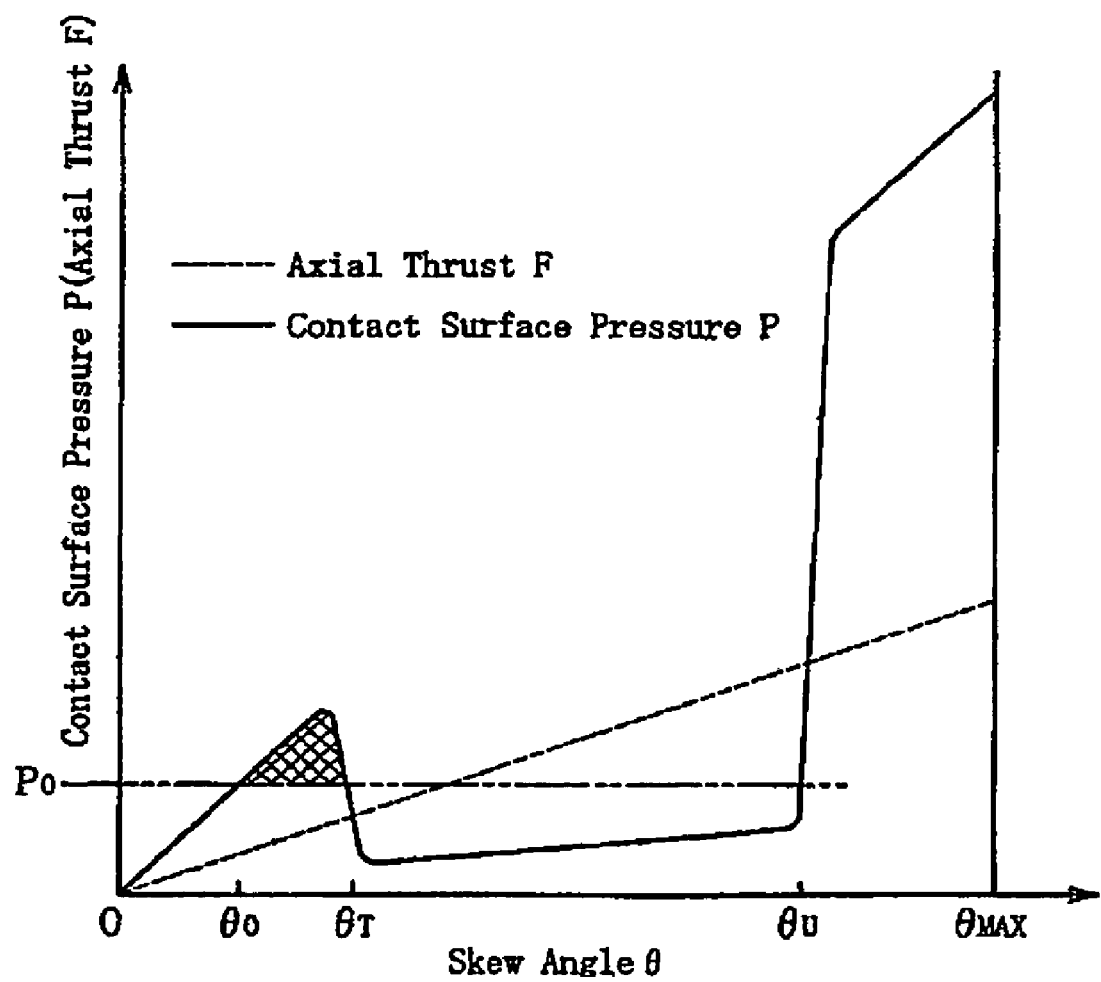
FIG. 10 is a graph showing the relationship between the skew angle θ of cylindrical rollers in a conventional cylindrical roller bearing and contact surface pressure P between cylindrical rollers and collars in solid line, and the relationship between the skew angle θ and the axial thrust F acted on the cylindrical rollers in broken line.

In the range of $\theta_T < \theta < \theta_U$, the surface contact pressure P moves stably within a relatively low range irrespective of the increase of the skew angle θ, as with the prior art case shown in FIG. 10.

As the skew angle θ approaches the value $\theta_U$, the contact surface pressure P increases abruptly and exceeds the level $P_0$ at the time point when it reaches the value $\theta_U$. However, as compared to the case with the prior art shown in FIG. 10, because the maximum skew angle $\theta_{MAX}$ is restricted to a small angle, the angle range $\theta_U \leq \theta < \theta_{MAX}$ within which the contact surface pressure P exceeds the level $P_0$ is much narrower.

Figure 8:
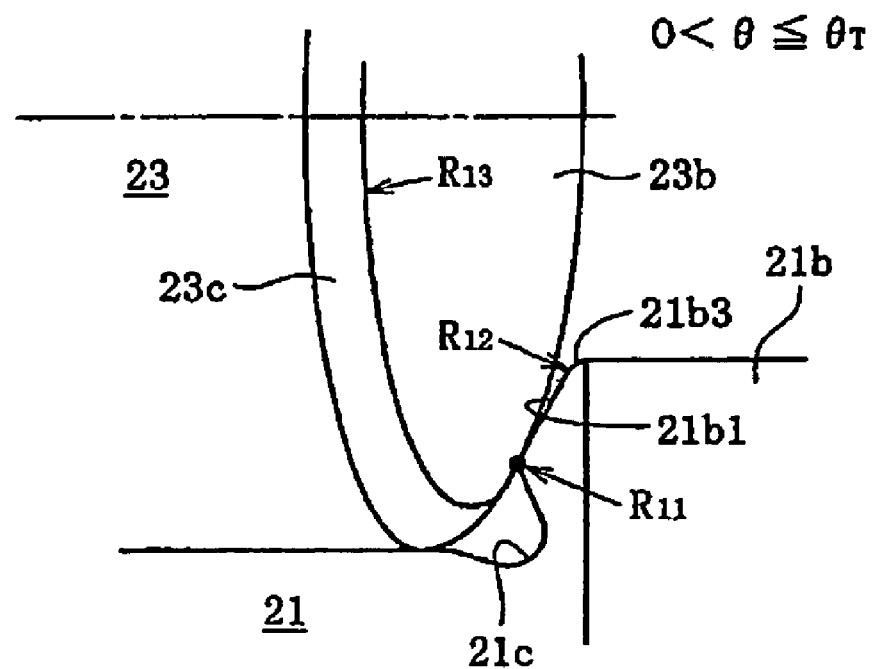
FIG. 8 is a diagram showing a state wherein a boundary between an end face and chamfer of a cylindrical roller is in contact with a boundary between a collar surface and a recess.
Figure 9:
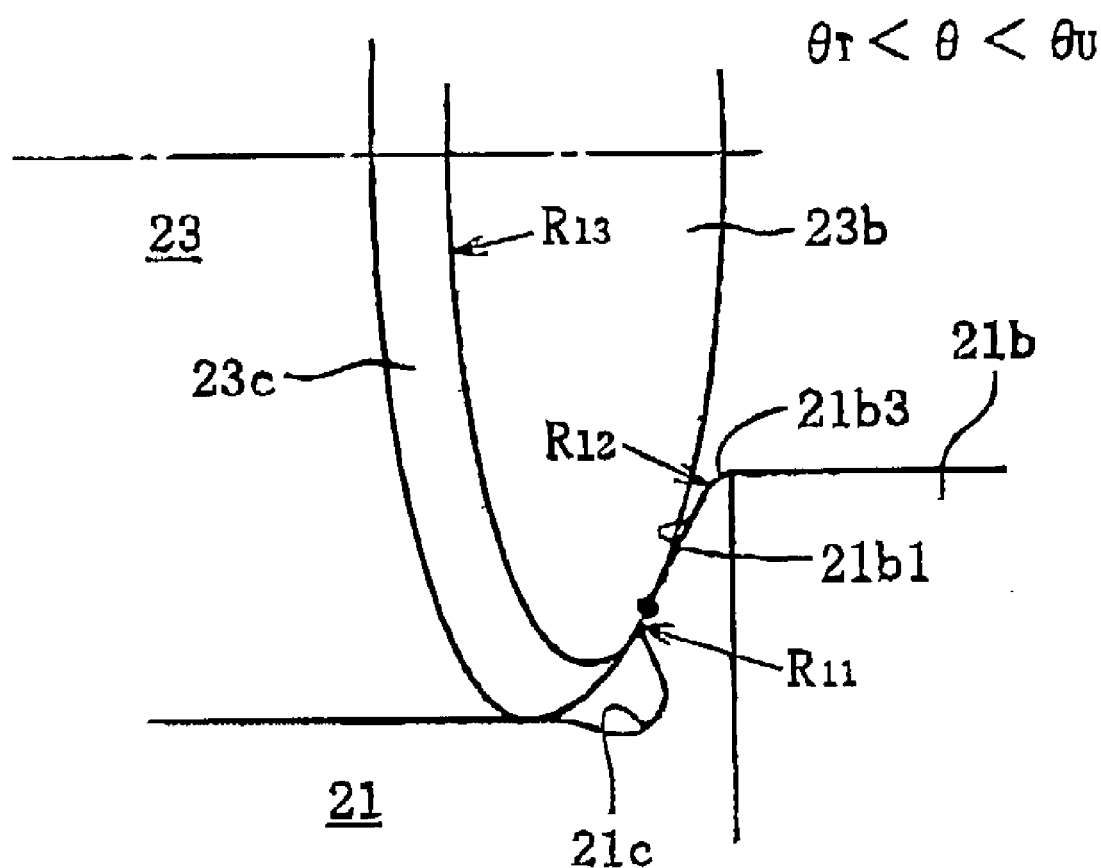
FIG. 9 is a diagram showing a state wherein the boundary between the end face and the chamfer of the cylindrical roller is in contact with the collar surface.

As described above, because the critical skew angle $\theta_T$ is restricted to a smaller angle than conventionally practiced, the contact state of the cylindrical roller 3 and the collar 1b is changed from the state of contact between the boundary R3 and the boundary R1 as shown in FIG. 8 to the state of contact between the boundary R3 and the collar surface 1b1 as shown in FIG. 9 at a smaller skew angle. The contact surface pressure P is thereby reduced, and wear and heat generation in the contact portions are suppressed.

Furthermore, because the maximum skew angle $\theta_{MAX}$ is restricted to a smaller angle than conventionally practiced, so that the angle range $\theta_U \leq \theta < \theta_{MAX}$ within which the contact surface pressure P exceeds the level $P_0$ is made narrower, the possibility that the cylindrical roller 3 and the collar 1b make contact with each other with a pressure larger than the level $P_0$ is made lower. Thereby, wear and heat generation in the contact portions are suppressed.

Figure 5:
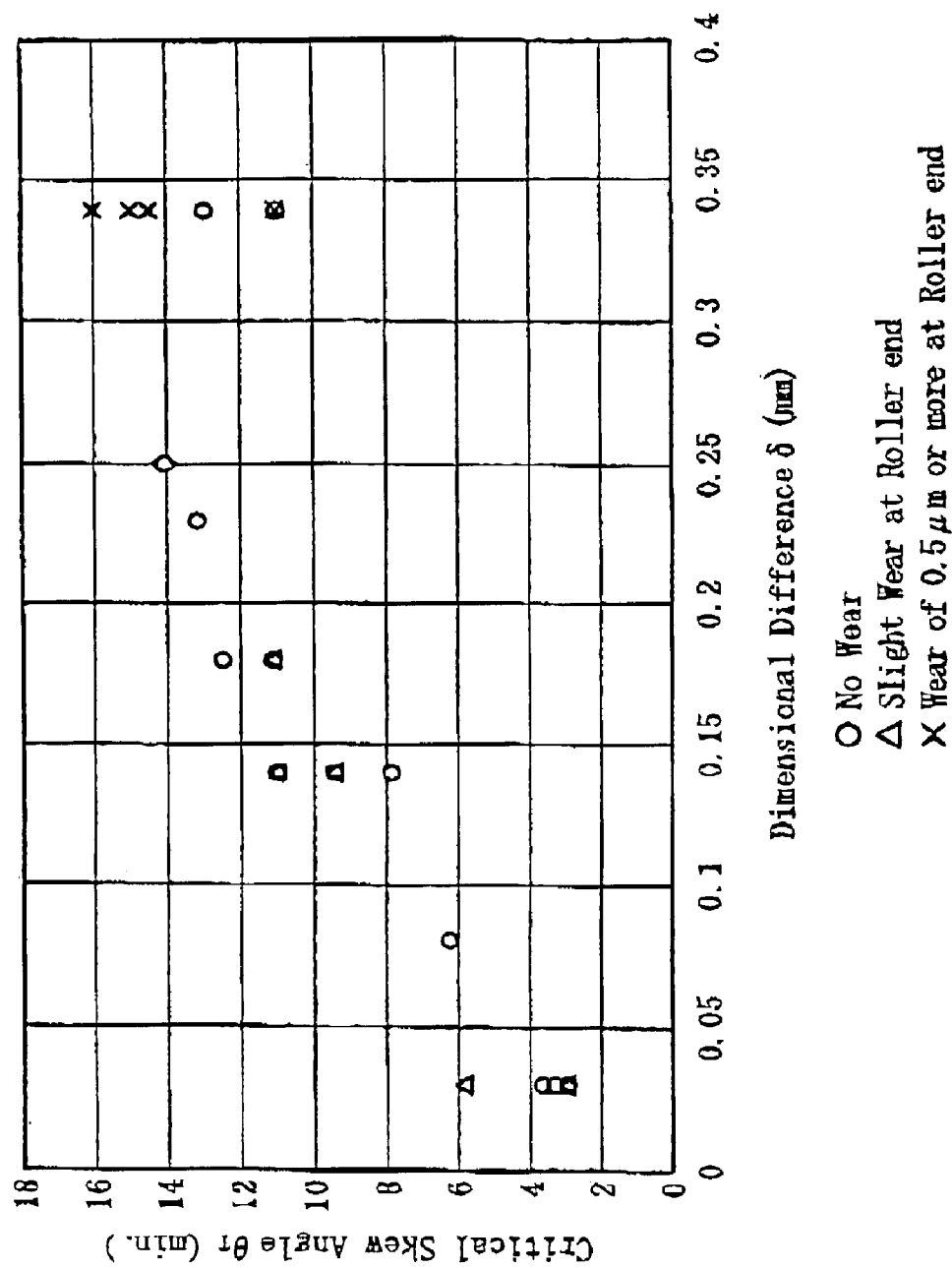
FIG. 5 is a graph showing test results.

Test bearings respectively having different dimensional differences δ were prepared and the relationship between the dimensional difference δ and critical skew angle $\theta_T$ were obtained. These test bearings were set in a test machine, which was operated under the following conditions, to find out how wear occurs at end portions of the cylindrical rollers. The results are shown in FIG. 5.

[Test Conditions]

Test Bearing: Single Row Cylindrical Roller Bearing N3020
   Diameter of Cylindrical Roller: 11 mm
   Length of Cylindrical Roller: 11 mm
   20 min.< $\theta_{MAX}$ <40 min.

Rotation Speed: 6000 rpm (dn=60×10$^4$)

Internal Clearance (Radial Internal Clearance after Assembly): −10 μm
   Lubrication: Grease
   Operation Time: 100 Hours As can be seen from FIG. 5, the critical skew angle $\theta_T$ was smaller in accordance with the decrease in the dimensional difference δ: In the range of δ≦0.25 mm, the critical skew angle $\theta_T$ was less than 15 minutes. According to observation results after the operation, when δ>0.3 mm, wear of 0.5 μm or more occurred at end portions of the cylindrical rollers in most test bearings. However, when δ≦0.25 mm, wear of 0.5 μm or more occurred in very few test bearings, and in fact wear hardly occurred or only slightly in most test bearings. This shows that the condition of δ≦0.3 mm, preferably δ≦0.25 mm, is effective in suppressing heat generation and wear in contact portions between the cylindrical rollers and the collars.

Next, text bearings of the same type as above having various different critical skew angles $\theta_T$ and maximum skew angles $\theta_{MAX}$ were prepared, and these test bearings were set in a test machine, which was then operated under the same conditions given above, to find out how wear occurs at end portions of the cylindrical rollers. The results are shown in FIG. 6.

Figure 6:
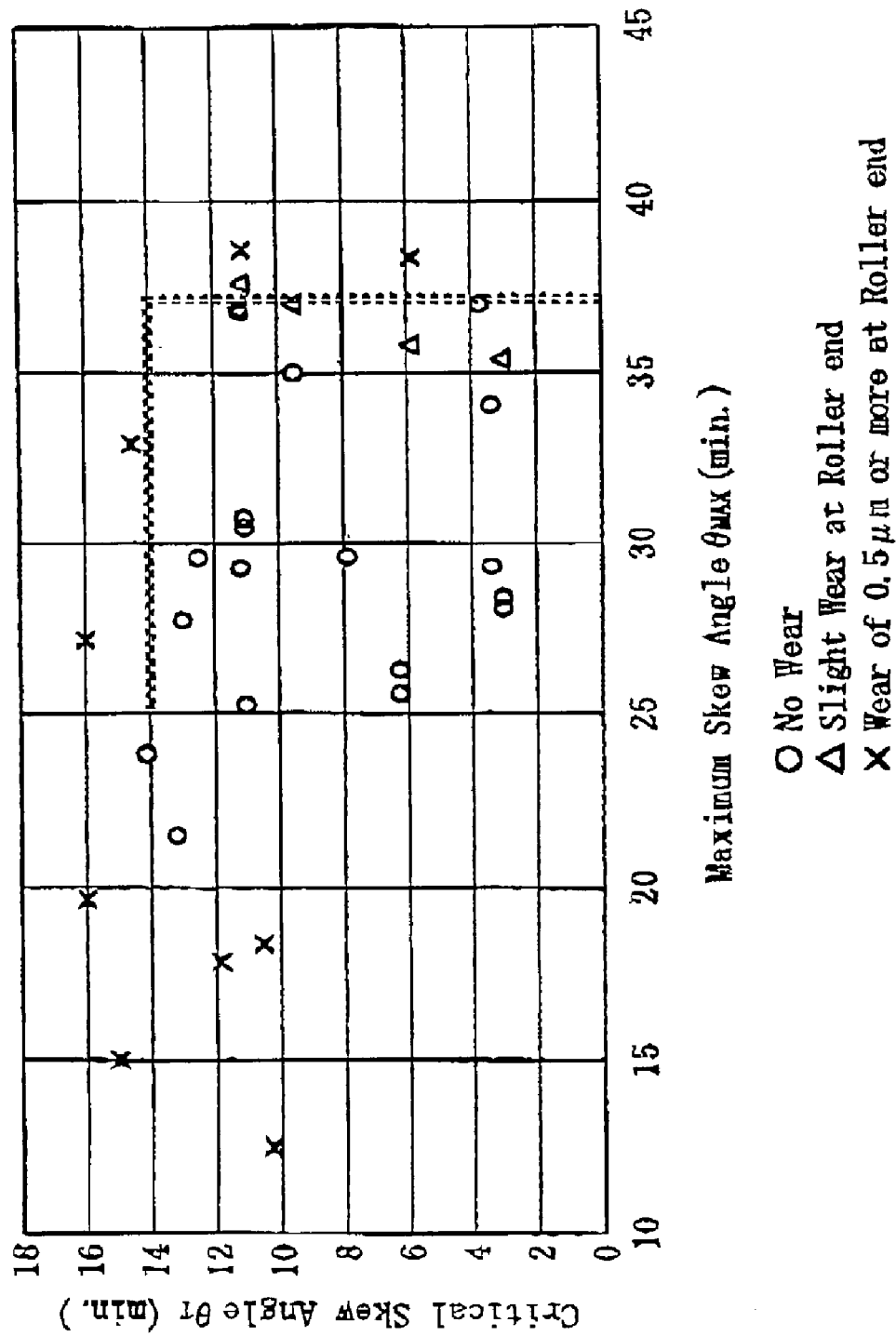
FIG. 6 is a graph showing test results.
Figure 7:
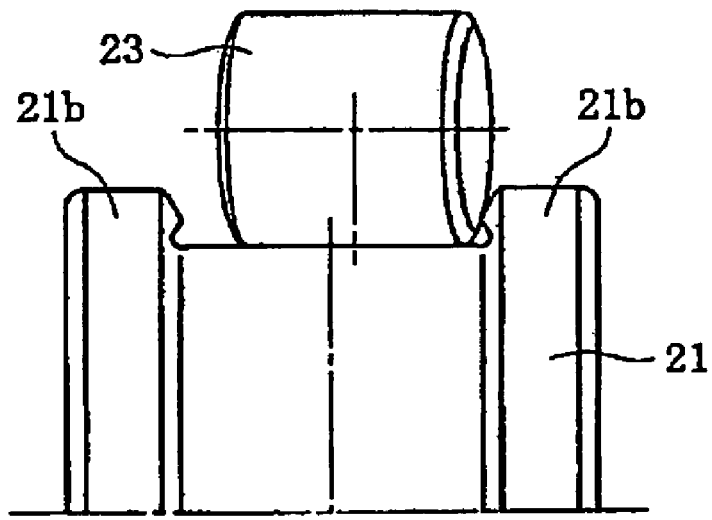
FIG. 7 is a model view of a cylindrical roller being skewed at a skew angle θ lower than a maximum skew angle $θ_{MAX}$ and making contact with a collar on one side.

As shown in FIG. 6, the level of wear differed depending on the critical skew angles $\theta_T$ and the maximum skew angles $\theta_{MAX}$. In relation to the critical skew angle $\theta_T$, when $\theta_T$>14 minutes, wear of 0.5 μm or more occurred in most of the test bearings, whereas when $\theta_T$≦14 minutes, wear hardly occurred or only slightly in most test bearings. This shows that the condition of $\theta_T$≦14 minutes is effective in suppressing heat generation and wear in contact portions between the cylindrical rollers and the collars. In relation to the maximum skew angle $\theta_{MAX}$, when $\theta_{MAX}$>37 minutes, wear of 0.5 μm or more occurred in most of the test bearings, whereas when $\theta_{MAX}$≦37 minutes, wear hardly occurred or only slightly in most test bearings. This shows that the condition of $\theta_{MAX}$≦37 minutes is effective in suppressing heat generation and wear in contact portions between the cylindrical rollers and the collars. Meanwhile, wear of 0.5 μm or more did occur in some of the test bearings even when $\theta_T$≦14 minutes and $\theta_{MAX}$≦37 minutes. This is considered to be because of local generation of heat and subsequent lack of lubrication in portions where the guide clearance between cylindrical rollers and collars were diminished for some reason or other such as machining tolerances of various components or temperature difference between the inner ring and the cylindrical rollers during the operation. The results in the drawing show that the above situation arises in the range of $\theta_{MAX}$<20 minutes, and therefore $\theta_{MAX}$ should preferably be 20 minutes or larger. To sum up, the conditions of $\theta_T$≦14 minutes and 20 minutes≦$\theta_{MAX}$≦37 minutes will be most effective in suppressing heat generation and wear in contact portions between the cylindrical rollers and the collars. To satisfy the condition of 20 minutes≦$\theta_{MAX}$≦37 minutes, the guide clearances between the cylindrical rollers and the collars should be in the range of from 0.2% to 0.45% of the length of the cylindrical rollers.

Figure 11:
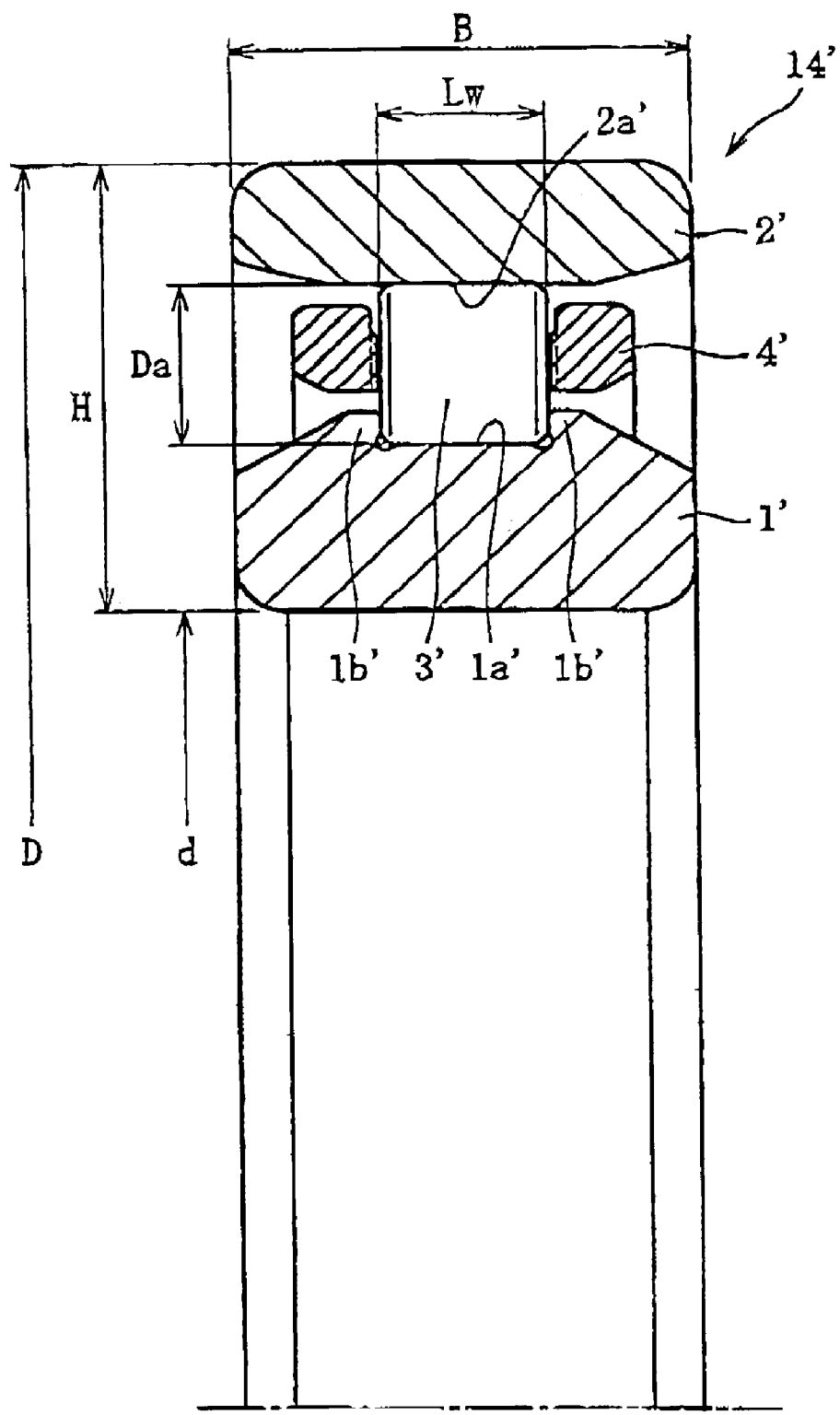
FIG. 11 is a cross-sectional view showing a cylindrical roller bearing according to another embodiment of the invention.

FIG. 11 shows a cylindrical roller bearing 14' disposed on the rear side according to another embodiment of the invention. The cylindrical roller bearing 14' includes an inner ring 1' having a raceway 1a' on its outer periphery, an outer ring 2' having a raceway 2a' on its inner periphery, a plurality of cylindrical rollers 3' rotatably arranged between the raceway 1a' of the inner ring 1' and the raceway 2a' of the outer ring 2', and a cage 4' for holding the cylindrical rollers 3' at circumferentially spaced locations. The inner ring 1' includes collars 1b' on both sides thereof.

The ratio of the diameter Da of the cylindrical rollers 3' to its cross-sectional height H expressed as (D−d)/2 (D: outer diameter of the bearing, d: inner diameter of the bearing) is set to satisfy the condition of 0.3≦Da/H<0.45, and the ratio of the length Lw of the cylindrical rollers 3' to the width of the bearing B is set to satisfy the condition of 0.3≦Lw/B<0.45, for the reasons discussed in the foregoing. The ratio of the length Lw to the diameter Da of the cylindrical rollers 3' is Lw/Da=1, for example. In addition to the above settings, the number of the cylindrical rollers 3' is set to be a predetermined value, i.e., fewer than the number of rollers normally provided in a standard cylindrical roller bearing, so that the bearing will have rigidity that is equal to or larger than that of combined angular ball bearings of the same inside and outer diameters.

Figure 12A:
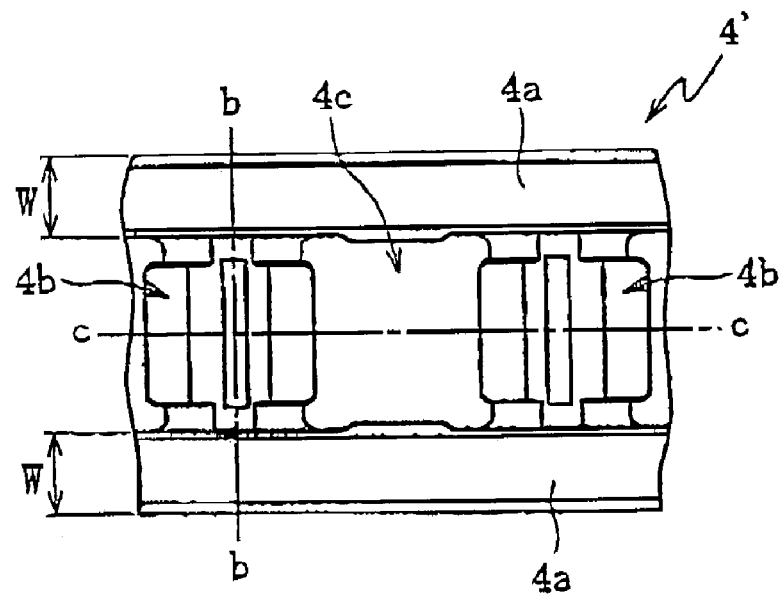
FIG. 12(a) is a partial top plan view of a cage.
Figure 12B:
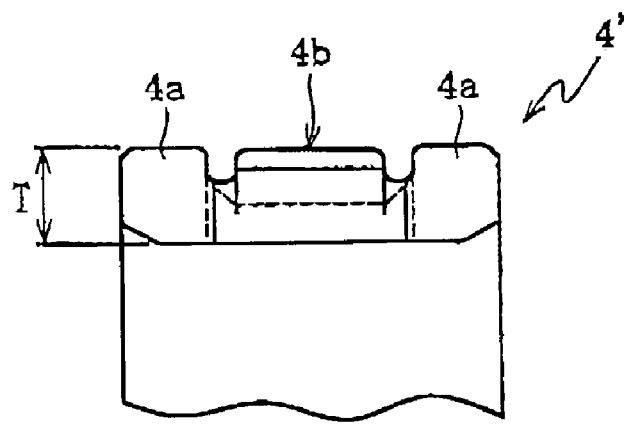
FIG. 12(b) is a cross section taken along the line b—b of FIG. 12(a)
Figure 12C:
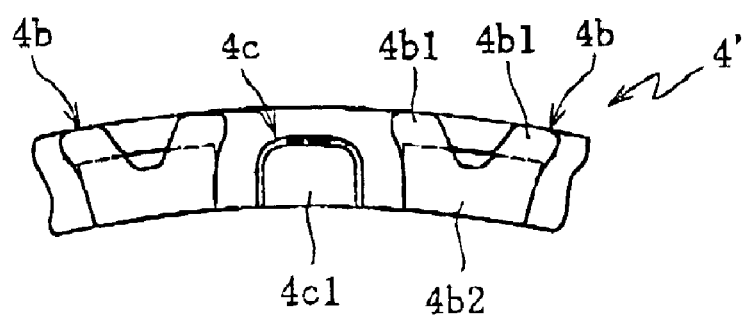
FIG. 12(c) is a cross section taken along the line c—c of FIG. 12(a).

The cage 4' is made of a resin material, e.g., polyether-ether-ketone (PEEK) to which 20 to 40 wt % of glass fiber or carbon fiber is mixed. As shown in FIG. 12, the cage 4' includes a pair of axially opposing annular portions 4a, a plurality of pillars 4b connecting the pair of annular portions 4a in the axial direction with a certain spacing therebetween, and square pockets 4c provided in between each two circumferentially adjacent pillars 4b. Each pillar 4b consists of a base portion 4b2 and a pair of tongue shaped portions 4b1 bifurcating in circumferential direction from the base portion 4b2. Axial end walls of the pockets 4c are formed with slightly protruding contact surfaces 4c1 for guiding the end faces of the cylindrical rollers 3'.

Figure 13:
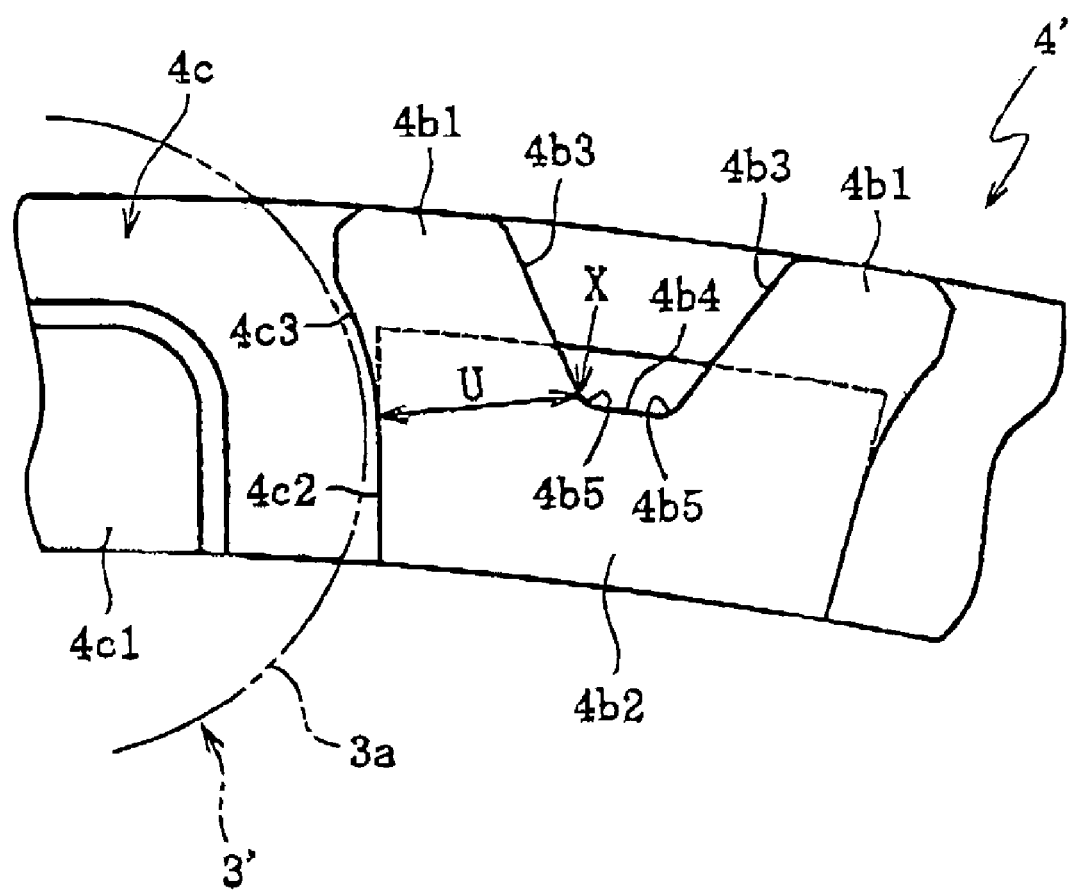
FIG. 13 is a partial enlarged cross-sectional view showing the vicinity of a pillar of the cage.

Circumferential end walls of the pockets 4c are formed by straight surfaces 4c2 on the inner diameter side and circular arc surfaces 4c3 on the outer diameter side as shown in the enlarged view of FIG. 13, and these surfaces are smoothly continuous with each other. The straight surface 4c2 is chiefly formed by a lateral face on one side of the base portion 4b2, and the circular arc surface 4c3 is chiefly formed by a lateral face on one side of the tongue shaped portion 4b1. The circular arc surface 4c3 has a slightly larger radius of curvature than that of the rolling surface 3a of the cylindrical roller 3', so that, when the cylindrical roller 3' relatively moves a certain distance within the pocket 4c toward the outer diameter side, the circular arc surface 4c3 engages with the cylindrical roller 3' and stops it from slipping out to the outer diameter side. The straight surface 4c2 and the circular arc surface 4c3 also form a guiding surface for guiding the rolling surface 3a of the cylindrical roller 3'. Between the two inside lateral faces 4b3 of the tongue shaped portions 4b1 is a bottom face 4b4, and the corners 4b5 where the lateral faces 4b3 and the bottom face 4b4 meet are rounded surfaces.

In this embodiment, various portions of the cage 4' have the following dimensions so as to secure required rigidity and strength: The ratio of the thickness U of the base portion of the tongue shaped portions 4b1 (see FIG. 13) to the diameter Da of the cylindrical roller 3' is set to be 0.2 or more, i.e., $U/Da \geq 0.2$. If the corners 4b5 are rounded surfaces, the thickness U of the base portion is determined as the minimum distance from a reference point X, which is an intersection between the lateral face 4b3 and the corner 4b5, to the straight surface 4c2 or the circular arc surface 4c3. The ratio of the axial thickness W of the annular portion 4a (see FIG. 12(a)) to the length Lw of the cylindrical roller 3' is set to be 0.4 or more, i.e., $W/Lw \geq 0.4$. The ratio of the circumferential thickness T of the annular portion 4a (see FIG. 12(b)) to the diameter Da of the cylindrical roller 3' is set to be $0.5 \leq T/Da \leq 0.6$.

Similarly to the cylindrical roller bearing 14 shown in FIG. 1, the inner ring 1' of the cylindrical roller bearing 14' of this embodiment is coupled on the outer periphery of the spindle 11, while its outer ring 2' is coupled on the inner periphery of the housing 12. Radial internal clearances of the bearing in operation are negative clearances, for example, and lubrication is provided by any of air/oil lubrication, oil mist lubrication, jet lubrication, and grease lubrication.

When the spindle 11 is rotated at high speed by the motor 10 built in the spindle apparatus, it is rotatably supported by the angular ball bearings 13 on the front side and the cylindrical roller bearing 14' on the rear side with respect to the housing 12. Any thermal expansion of the spindle 11 in the axial direction due to temperature rise during the operation is absorbed or relieved by sliding displacement between the outer ring 2' and the cylindrical rollers 3' of the cylindrical roller bearing 14'.

Figure 14:
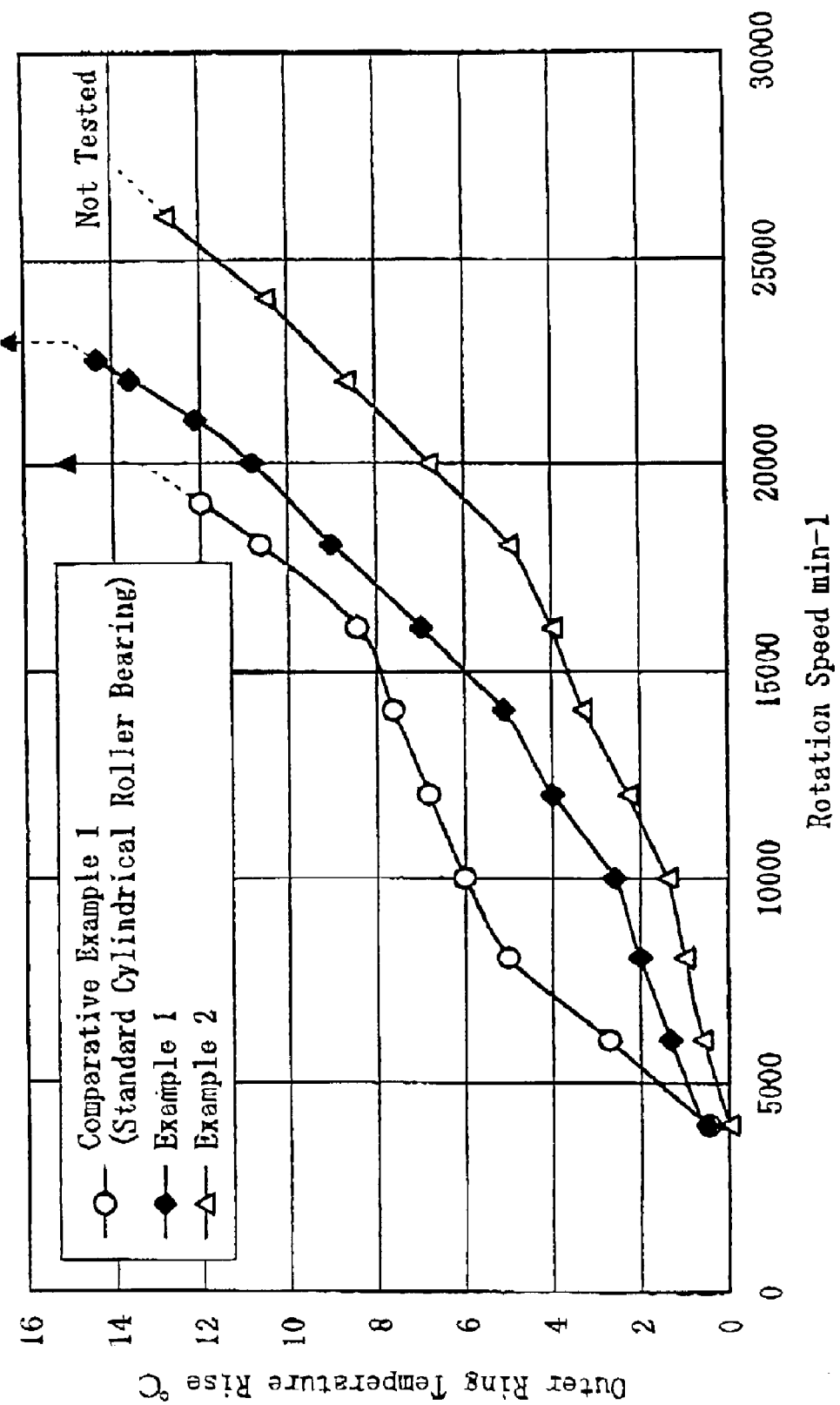
FIG. 14 is a graph showing the relationship between rotation speed and temperature rise of an outer ring under the condition in which air/oil lubrication is provided.

The following examples 1, 2 and comparative example 1 of cylindrical roller bearings were operated with an air/oil lubrication system in a condition wherein the inner ring was rotated, and the relationship between the rotation speed and the temperature rise of the outer ring was obtained. The results are shown in FIG. 14.

[Test Bearings]

Example 1: Cylindrical Roller Bearing (Da=7 mm, Lw=7 mm, Number of Rollers: 20, Cage: Machined High Tension Brass Casting Cage, Da/H=0.35, LW/B=0.35)

Example 2: Cylindrical Roller Bearing (Da=7 mm, Lw=7 mm, Number of Rollers: 20, Cage: PEEK+30 wt % Carbon Fiber, Da/H=0.35, LW/B=0.35)

Comparative example 1: Standard Cylindrical Roller Bearing (Da=9 mm, Lw=9 mm, Number of Rollers: 23, Cage: Machined High Tension Brass Casting Cage, Da/H=0.45, LW/B=0.45)

[Points Common to All Examples]

Bearing Size: d=70 mm, D=110 mm, B=20 mm

Bearing Clearance: Initial Radial Clearance after Assembly=0 μm

Lubrication: Air/Oil (VG32)

Housing Cooling: Provided

As can be seen from FIG. 14, the temperature rise of the outer ring was slower in the cylindrical roller bearings of the examples 1, 2 than in the comparative example 1, and was particularly so in the example 2 which used a cage made of PEEK and 30 wt % of carbon fiber.

Figure 15:
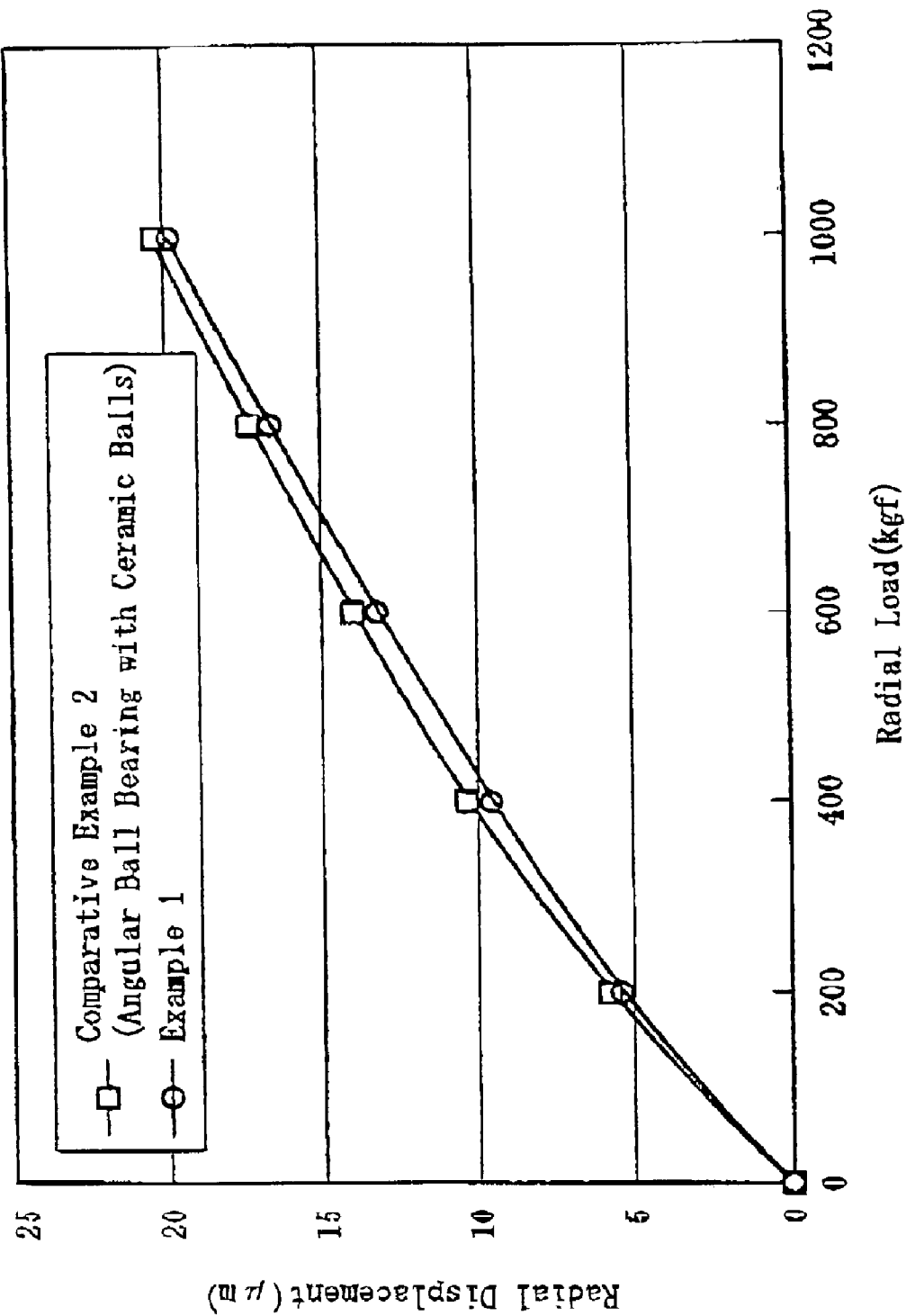
FIG. 15 is a graph showing the comparison calculation results of radial rigidity.

FIG. 15 shows calculation results of radial rigidity with respect to the cylindrical roller bearing of the above example 1 and duplex angular ball bearings of the following comparative example 2:

Comparative example 2: NTN Ceramic Ball Back-to-Back Duplex Angular Contact Bearing (5S-HSBO14CDB/GL)

Contact Angle=15°, Pre-Load; light, Bearing Size: Same as Example 1

As can be seen from FIG. 15, radial rigidity in the cylindrical roller bearing of example 1 was substantially equal to or more than that of the duplex angular ball bearings of comparative example 2.

Figure 16:
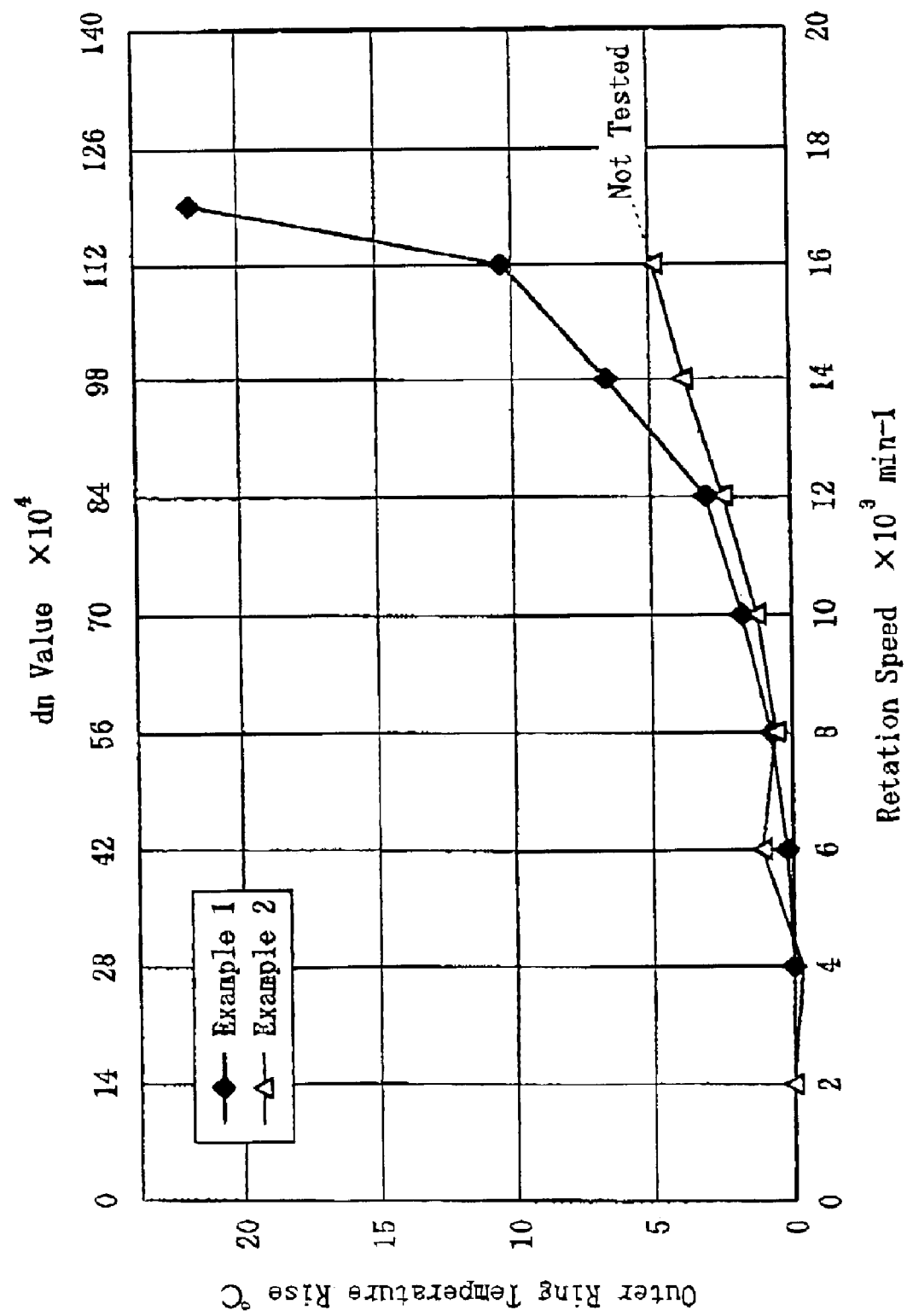
FIG. 16 is a graph showing the relationship between rotation speed and temperature rise of the outer ring under the condition in which grease lubrication is provided.
Figure 17:
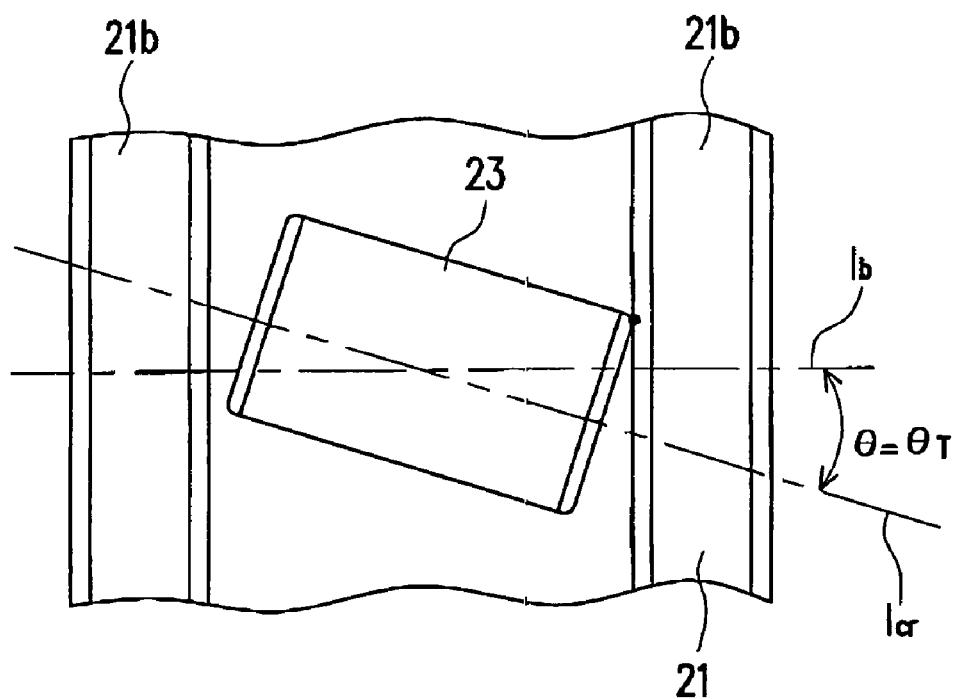
FIG. 17 is an enlarged top view of FIG. 7 under a condition that the boundary R13 is in contact with the boundary R11.
Figure 18:
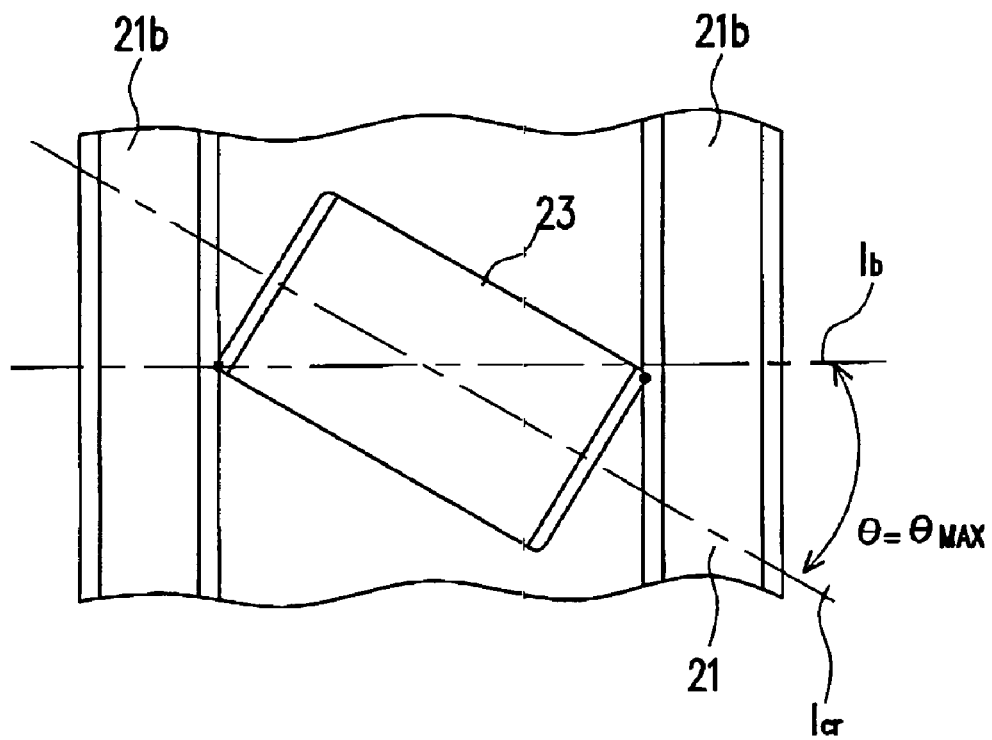
FIG. 18 is an enlarged top view of FIG. 7 under a condition that the both ends of the cylindrical rollers respectively are in contact with the collars on both sides.

Next, the cylindrical roller bearings of the above examples 1, 2 were operated with a grease lubrication system in a condition wherein the inner ring was rotated, to obtain the relationship between the rotation speed and the temperature rise of the outer ring. The results are shown in FIG. 16.

[Points Common to both Examples]

Bearing Clearance: Initial Radial Clearance after Assembly=0 μm

Amount of Sealed Grease: 10% of Space Volume

Housing Cooling: Provided

As can be seen from FIG. 16, a sharp inclination was observed in the temperature rise in the high speed range of $12 \times 10^3$/min rpm or more in the cylindrical roller bearing of example 1 which used a machined high tension brass casting cage. On the other hand, no such drastic temperature rise was observed even in the high speed range of $12 \times 10^3$/min rpm or more in the cylindrical roller bearing of example 2 which used the resin cage made of PEEK and 30 wt % of carbon fiber. This shows that the cylindrical roller bearing of example 2 is more suitable for high speed applications with a grease lubrication system.

It should be noted that all structures pertaining to the cylindrical roller bearing 14 of the embodiment shown in FIG. 2 can be applied to the cylindrical roller bearing 14' of the other embodiment shown in FIG. 11.

What is claimed is:

1. A cylindrical roller bearing, comprising an inner ring having a raceway on an outer periphery thereof, an outer ring having a raceway on an inner periphery thereof, and a plurality of cylindrical rollers rotatably arranged between the raceway of the inner ring and the raceway of the outer ring, at least one of the inner ring and the outer ring being provided with collars respectively on both sides of its raceway, and at least one of the collars being provided with a recess at a corner where the raceway intersects a collar surface, wherein a critical skew angle $\theta_T$, that is a maximum skew angle at which a boundary between an end face and a chamfer of the cylindrical roller makes contact with a boundary between the collar surface and the recess, is restricted within a range of "$\theta_T \leqq 14$ minutes"; and a maximum skew angle $\theta_{MAX}$, at which both ends of a cylindrical roller respectively make contact with the collars on both sides, is restricted within a range of "20 minutes $\leqq \theta_{MAX} \leqq 37$ minutes".

2. The cylindrical roller bearing according to claim 1, wherein at least one of the chamfer of the cylindrical rollers and the recess provided to the inner ring is formed by machining after a heat treatment.

3. The cylindrical roller bearing according to claim 1 assembled in a spindle apparatus of a machining tool.

4. The cylindrical roller bearing according to claim 1, wherein the critical skew angle $\theta_T$ is restricted by controlling a dimensional difference $\delta$ between a height h1 of the recess and a height h2 of the chamfer of the cylindrical roller within a predetermined limit.

5. The cylindrical roller bearing according to claim 4, wherein the dimensional difference $\delta$ is controlled to be 0.3 mm or smaller.

* * * * *